United States Patent [19]

Fargo

[11] Patent Number: 5,929,545
[45] Date of Patent: Jul. 27, 1999

[54] END SHIELD FOR AN ELECTRIC MOTOR, ELECTRIC MOTOR CONSTRUCTION, AND METHOD OF ASSEMBLING ELECTRIC MOTOR

[75] Inventor: Vincent P. Fargo, St. Louis, Mo.

[73] Assignee: Emerson Electric Co., St. Louis, Mo.

[21] Appl. No.: 08/979,975

[22] Filed: Nov. 26, 1997

[51] Int. Cl.[6] ....................................................... H02K 5/00
[52] U.S. Cl. .............................. 310/89; 310/260; 310/217; 310/218
[58] Field of Search ............................. 310/89, 260, 217, 310/218

[56] References Cited

U.S. PATENT DOCUMENTS 4,306,168   12/1981   Peachee ................................... 310/217

Primary Examiner—Nestor Ramirez
Assistant Examiner—Thanh Lam
Attorney, Agent, or Firm—Howell & Haferkamp, LC

[57] ABSTRACT

An end shield for mounting on a stack of laminations forming the stator of an electric motor. The end shield has an inner face facing the stack, mounting openings alignable with holes extending into the stack, and a spacer on the inner face adjacent at least one of the openings to space the inner face from the stack so that a threaded fastener extending through the mounting opening and into a hole in the stack can more readily pull material surrounding the hole upwardly to form a protuberance on the stack to engage and resist movement of the end shield relative to the stack. The motor incorporates at least one end shield of this construction. According to the method of this invention, at least one end shield is installed on the stator.

16 Claims, 1 Drawing Sheet

END SHIELD FOR AN ELECTRIC MOTOR, ELECTRIC MOTOR CONSTRUCTION, AND METHOD OF ASSEMBLING ELECTRIC MOTOR

FIELD OF THE INVENTION

This invention relates to electric motors, and in particular to electric motors of the type in which the end shields are mounted directly on the stator.

BACKGROUND OF THE INVENTION

In certain electric motor constructions, the motor end shields are mounted directly on the stator, which is formed from a stack of laminations. The end shields are usually secured with a threaded screw or a through-bolt. Depending upon the types of materials used, however, the end shield may move relative to the stack. Because the rotor is mounted in the end shields, movement of the end shields results in movement of the rotor, which can affect the operation of the motor. This can particularly be a problem with steel end shields, because of their smooth hard surfaces.

SUMMARY OF THE INVENTION

The present invention relates to an improved end shield, a motor incorporating the improved end shield, and a method of assembling motors using the improved end shield. Generally, the end shield of this invention is adapted to be mounted directly on the stator of an electric motor which is comprised of a stack of laminations. The stator has a plurality of holes therein for mounting the end shield. The end shield comprises an inner face, adapted to face the stack of laminations, and a plurality of mounting openings alignable with the holes in the stator. According to the present invention a spacer is provided on the inner face of the end shield, associated with at least one of the mounting openings, and preferably with each of the mounting openings. In this preferred embodiment the spacer comprises a raised ring on the inner face surrounding the mounting opening.

When a threaded fastener is threaded through the mounting opening and into the aligned hole in the stack and tightened, the threaded fastener pulls the material surrounding the hole in the top-most lamination in the stack upwardly into the space between the top surface of the stator and the inner face of the end shield. This forms a protuberance or bump on the top surface of the stator engagable by the end shield which resists relative movement between the end shield and the stator. The engagement between the spacer and the protuberance formed on the top-most lamination is sufficient to resist relative movement between the end shield and the stator, but in the preferred embodiment the material from the top-most lamination is pulled sufficiently upwardly to extend into the mounting opening. The tightening of the threaded fastener also tends to embed the spacer, which in the preferred embodiment has a relatively sharp crest, in the surface of the top lamination, providing further resistance to relative movement between the end shield and the stator.

The end shield of the present invention can be quickly and inexpensively fabricated, yet it resists undesired movement between the end shield and the stator. The end shield is quickly and easily installed on the stator of a motor, and once installed the resulting motor is resistant to in-service movement of the end shields which results in movement of the rotor.

BRIEF DESCRIPTION OF THE DRAWINGS

Corresponding reference numerals indicate corresponding parts throughout the several views of the drawings.

DETAILED DESCRIPTION OF THE PREFERRED EMBODIMENTS

Figure 1:
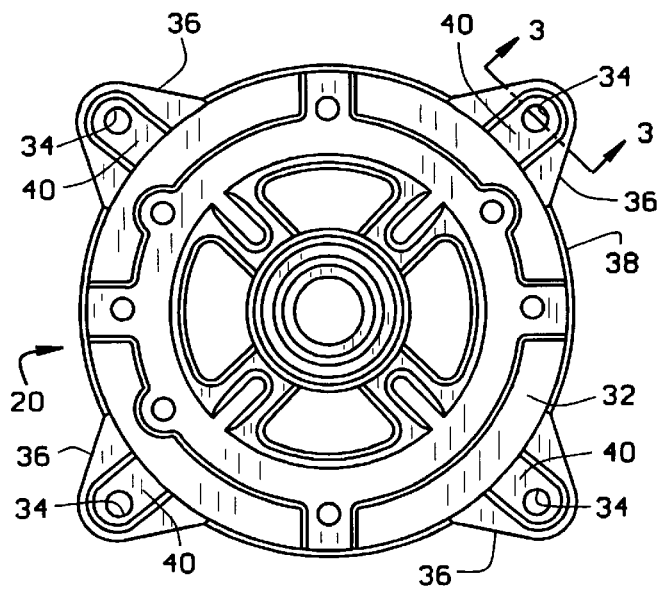
FIG. 1 is plan view of the outer face of a motor end shield constructed according to the principles of this invention.
Figure 4:
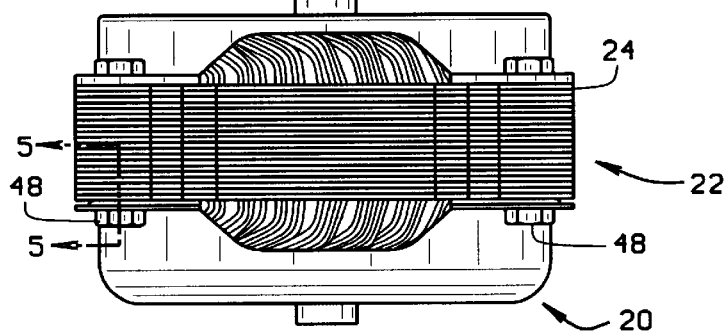
FIG. 4 is a side elevation view of a motor constructed according to the principles of this invention.
Figure 5:
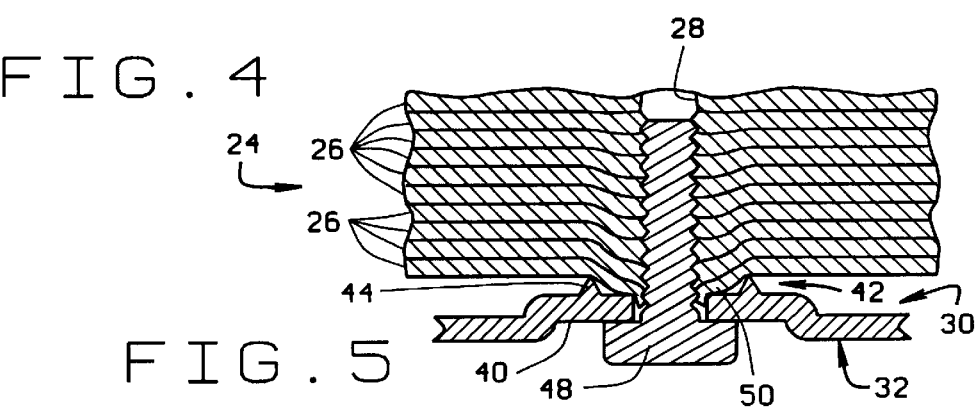
FIG. 5 is an enlarged cross-sectional view of the end shield and stator, taken along the plane of line 5—5 in FIG. 4.

A motor end shield constructed according to the principles of this invention is indicated generally as 20 in FIG. 1. As best shown in FIG. 4, the motor end shield 20 is adapted to be mounted on the end of a motor stator 22 made from a stack 24 of laminations 26. The stator 22 has a plurality of holes 28 therein for mounting the end shield 20.

The end shield 20 has an inner face 30, which faces the stack, and an outer face 32. There are a plurality of mounting openings 34 on the end shield 20, alignable with the holes 28 in the stator. As shown in FIG. 1, the mounting openings 34 are located on tabs 36 projecting from the main body 38 of the end shield 20. The mounting openings are positioned in recesses 40 formed in the tabs 36.

Figure 2:
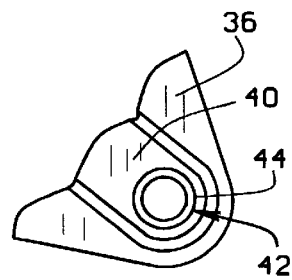
FIG. 2 is a partial plan view of the inner face of the motor end shield, showing one of the spacers.
Figure 3:
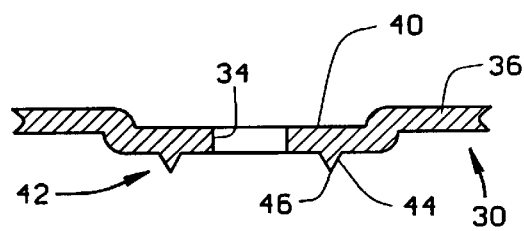
FIG. 3 is a partial vertical cross-sectional view of the motor end shield through one of the spacers, taken along the plane of line 3—3 in FIG. 1.

There is a spacer 42 associated with at least one of the mounting openings 34, and preferably with each of the mounting openings. The spacer 42 projects outwardly from the inner face 30 of the end shield 20, to engage the top of the stack 24, and space the end shield from the top of the stack in the vicinity of the mounting opening. As shown in FIG. 2, the spacer 42 is preferably a raised ring 44 surrounding the mounting opening 34. This ring could be continuous, as shown, or comprise one or more segments. The ring 44 has a height of 0.015 inches, and a diameter at its crest of 0.370 inches. As shown in FIG. 3, the cross section of the ring 44 preferably has a relatively sharp crest 46, with an included angle of 60°. The ring 44 can be made by stamping.

The end shield 20 is positioned over the top of the stack 24, with the mounting openings 34 aligned with the holes 28 in the stack. A threaded fastener 48 is threaded through the mounting opening 34 and into the hole 28. The fastener 48 is tightened until the fastener draws the material from the laminations that surrounds the hole 28 into the space between the top of the stack 24 and the inner face 30 of the end shield. This forms a protuberance 50 on the surface of the stator which the end shield 20, and particularly the ring 44, engages to resist relative movement between the end shield and the stator. The fastener 48 is preferably tightened sufficiently to draw the material from the laminations up into the mounting opening 34.

Without the ring 44, if the inner face 30 sat flush against the top of the stack 24, the material surrounding the hole 28 could not flex sufficiently to form a substantial enough protrusion to significantly reduce relative movement of the end shield and stator. Because the ring 44 is spaced radially outwardly from the mounting opening 34, there is sufficient space for the top-most lamination 26 in the stack 24 to bend upwardly so that it can project into the space between the top of the stator 22 and the inner face 30 of the end shield 20, and preferably so that it can project into the mounting opening 34.

OPERATION

In operation an end shield 20 and a stator 22 are provided. The end shield 20 is positioned over the top of the stack 24 of laminations 26 forming the stator 22, and the mounting openings 34 in the end shield are aligned with the holes 28 in the stator. A threaded fastener 48 is threaded through each mounting opening 34 in the end shield 20 and into the aligned hole 28 in the stator 22. The threaded fasteners 48 are tightened to secure the end shield 20 to the stator 22. With those mounting openings 34 that have spacers 42 associated with them, which in this preferred embodiment is all of them, the tightening of the fastener 48 draws material from the laminations (and particularly the top-most lamination) surrounding the hole 28 outwardly toward the inner face 30 of the end shield, into the space between the top of the stack 24 and the end shield. This forms a protuberance 50 on the top face of the stack 24, inside the ring 44. This protuberance 50 preferably projects sufficiently outwardly to extend into the mounting opening 34. At the same time, the action of the threaded fastener 48 also tends to embed the crest 46 of the ring 44 in the surface of stator.

The end shield 20 (and particularly the spacer 42 and the mounting opening 34) engages the protuberances 50 formed on the surface of the stator 22 to resist relative movement between the end shield and the stator. Thus, the end shield of the present invention can be quickly and easily installed on a stator without special tools or procedures, yet once installed, resists relative movement with respect to the stator, so that the rotor remains properly positioned.

What is claimed is:

1. An end shield for mounting on a stack of laminations forming the stator of an electric motor, the end shield having an inner face facing the stack, mounting openings alignable with holes extending into the stack, and a spacer on the inner face adjacent at least one of the mounting openings to space the inner face from the stack so that a threaded fastener extending through a mounting opening and into a hole in the stack can more readily pull material from the top-most lamination surrounding the hole to form a protuberance on the surface to engage and resist movement of the end shield relative to the stack.

2. The end shield according to claim 1 wherein the spacer is a raised ring on the inner surface of the end shield surrounding the opening.

3. The end shield according to claim 2 wherein the raised ring has a cross-section with a sharp crest adapted to press into and engage the top of the stack.

4. The end shield according to claim 2 wherein the raised ring is continuous.

5. The end shield according to claim 1 wherein there is a spacer associated with each mounting opening.

6. A motor comprising a stack of laminations forming the stator having first and second ends, with holes in each end; an end shield mounted on each end of the stack, the end shield having an inner face facing the stack, mounting openings aligned with the holes in the end of the stack, and a spacer on the inner face associated with at least one of the mounting openings, separating the inner face from the top of the stack, and threaded fasteners extending through the mounting openings and into the holes, the fasteners tightened sufficiently to raise the portion of the material of the top-most laminations into the space between the inner face and the top of the stack to form a protuberance on the stack for resisting relative movement of the end shield and stack.

7. The motor according to claim 6 wherein the spacer comprises a raised ring on the inner face of the end shield extending around the mounting opening.

8. The motor according to claim 7 wherein the ring has a cross section with a sharp crest that is embedded into the top of the stack.

9. The motor according to claim 6 wherein the raised ring is continuous.

10. The motor according to claim 6 wherein there is a spacer associated with each mounting opening in the end shield.

11. A method of securing an end shield on a motor, the method comprising the steps of:

providing a stack of laminations forming a stator, and having a plurality of holes therein;

providing at least one end shield having an inner face, a plurality of mounting openings alignable with the holes in the stator, and a spacer, associated with at least one mounting opening, on the inner face;

positioning the end shield over the stack with the mounting openings aligned with the holes;

threading fasteners through the mounting openings and into the aligned holes in the stack, and tightening the fasteners sufficiently to draw the material surrounding the hole in the top-most lamination upwardly into the space between the inner face of the end shield and the stack to form a protuberance on the surface of the stack.

12. The method according to claim 11 wherein the fasteners are tightened sufficiently to draw the material surrounding the hole in the top-most lamination into the mounting opening.

13. The method according to claim 11 wherein the spacer comprises a ring surrounding the mounting opening.

14. The method according to claim 13 wherein the protuberance formed on the top of the stack projects sufficiently to engage the ring, thereby resisting relative movement between the end shield and the stack.

15. The method according to claim 13 wherein the cross section of the ring has a crest, and wherein the fasteners are tightened sufficiently to embed the crest of the ring in the face of the stack.

16. A method of securing an end shield on a stack of laminations in the manufacture of an electric motor, the method comprising providing an end shield having an inner face for facing the stack, mounting openings alignable with holes in the stack, and a spacer on the inner face adjacent at least one of the mounting openings; aligning the mounting openings in the end shield with the holes in the stator; threading a fastener through the mounting opening and into the hole in the stator, and tightening the fastener sufficiently to draw some of the material surrounding the hole in the top most lamination into the space between the top of the stack and the inner face of the end shield, to form a protuberance on the top of the stack for resisting relative movement between the end shield and the stack.

\* \* \* \* \*